(12) United States Patent
Selby

(10) Patent No.: US 6,921,086 B2
(45) Date of Patent: Jul. 26, 2005

(54) SEALING DEVICE

(75) Inventor: Alan L Selby, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/455,424

(22) Filed: Jun. 6, 2003

(65) Prior Publication Data
US 2004/0007831 A1 Jan. 15, 2004

(30) Foreign Application Priority Data
Jul. 9, 2002 (GB) .............................................. 0215815

(51) Int. Cl.⁷ .......................... F16L 17/06; F16L 17/00; F16L 15/02
(52) U.S. Cl. ....................... 277/609; 277/616; 277/630; 277/637
(58) Field of Search ................................ 277/609, 616, 277/628, 630, 637, 640–642, 650

(56) References Cited

U.S. PATENT DOCUMENTS

| | | | | |
|---|---|---|---|---|
| 2,867,464 A | * | 1/1959 | Crampton | 277/598 |
| 2,898,648 A | * | 8/1959 | Bright | 49/490.1 |
| 3,638,359 A | | 2/1972 | Kruschwitz | |
| 4,441,726 A | * | 4/1984 | Uhl | 277/652 |
| 4,652,695 A | * | 3/1987 | Busby | 174/35 GC |
| 4,820,885 A | * | 4/1989 | Lindsay | 174/35 GC |
| 4,866,213 A | * | 9/1989 | Lindsay | 174/35 GC |
| 5,029,254 A | * | 7/1991 | Stickney | 174/35 GC |
| 5,120,903 A | * | 6/1992 | Tam | 174/35 GC |
| 5,970,586 A | | 10/1999 | Demel | |
| 6,098,992 A | * | 8/2000 | Long et al. | 277/637 |
| 6,318,734 B1 | * | 11/2001 | Boskamp | 277/598 |

FOREIGN PATENT DOCUMENTS

| | | |
|---|---|---|
| DE | 3 424 290 A | 2/1985 |
| EP | 0 926 357 A | 6/1999 |
| GB | 851521 SP | 10/1960 |
| GB | 878909 SP | 10/1961 |
| GB | 1 279 468 SP | 6/1972 |
| GB | 2 132 708 A | 7/1984 |
| GB | 2 172 642 A | 9/1986 |
| GB | 2 178 466 A | 2/1987 |
| GB | 2 273 734 A | 6/1994 |

* cited by examiner

Primary Examiner—Alison Pickard
Assistant Examiner—Vishal Patel
(74) Attorney, Agent, or Firm—W. Warren Taltavull; Manelli Denison & Selter PLLC

(57) ABSTRACT

A seal structure (10) has a flange (12) which locates against the flange of another member (22) and is held there by a "U" shaped clip (32). Member (22) has one or more cut outs (30) in its flange, and clip (32) has a corresponding number of tags (34) formed in one leg of its "U" shape. The or each tag (34) is bent inwards. On assembly, the flange of member (22) is placed against flange (12) and clip (32) is pushed over the sub assembly until the tag(s) (34) locate in a respective cut out (30). The need for drilling holes and riveting or bolting the assembly together is thus obviated.

3 Claims, 4 Drawing Sheets

SEALING DEVICE

FIELD OF THE INVENTION

The present invention relates to a device enabling the sealing of one space against ingress of the contents of an adjacent space, which contents may be solids, fluids, or a burning substance.

BACKGROUND OF THE INVENTION

Where the contents are a burning substance, it is known to provide a flexible seal assembly which is held together by rivets or the like, passing through metallic strips trapping an end of the assembly. Such an example is described and illustrated in published GB patent specification 1,279,468.

A disadvantage of the published disclosure is that the assembly has to be held together by means other than the rivets, until the rivet holes are drilled and while fixing of the rivets is effected. Alternatively, the rivet holes may be drilled in each individual part prior to assembly, and then aligned during the holding of the parts together by some means, so as to enable fixing of the rivets. Both methods are time consuming operations.

SUMMARY OF THE INVENTION

The present invention seeks to provide an improved sealing device construction.

According to the present invention a sealing device comprises a first member having back to back plane surfaces, a seal having back to back plane surface portions, one of which locates against a said plane surface of said member, and a clip having length and a "U" shaped profile normal thereto, in which said member and said seal nest when the sealing device is assembled, and co-operating fixing means formed in said member and in one leg of said "U" shape, which fixing means, on assembly of the parts, engage each other and prevent inadvertent separation thereof.

BRIEF DESCRIPTION OF DRAWINGS

The invention will now be described, by way of example and with reference to the accompanying drawings in which.

DETAILED DESCRIPTION OF THE INVENTION

Figure 1:
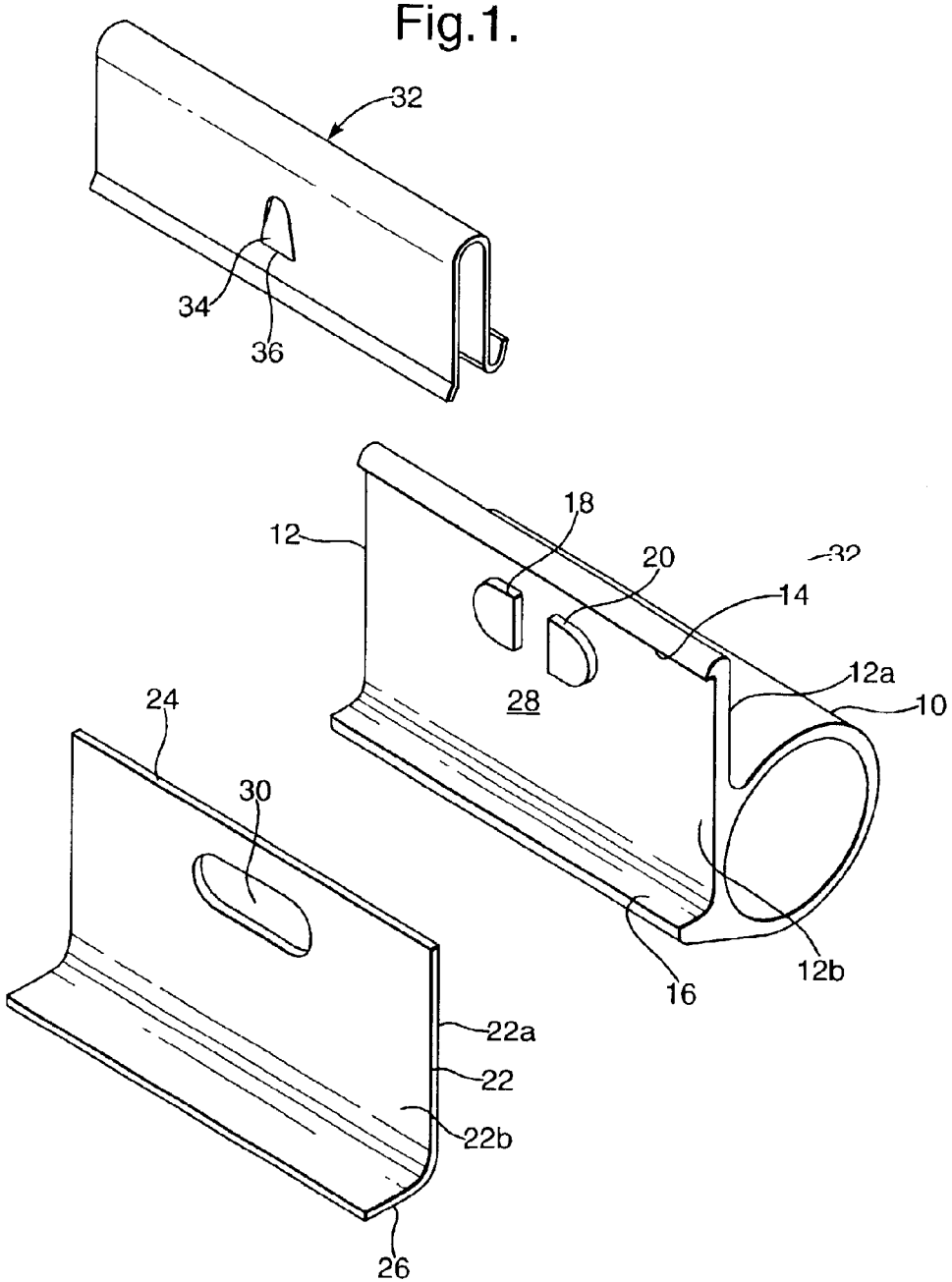
FIG. 1 is an exploded, pictorial view of the constituent parts of an example of the present invention.

Referring to FIG. 1. An elongate flexible seal member 10 has a flange 12, defined by back to back plane surfaces 12a and 12b, formed integrally thereon. Flange 12 includes respective top and bottom lips 14 and 16. A pair of spaced bosses 18 and 20 are formed or otherwise fixed on plane surface 12b, for reasons explained later in this specification. The material from which seal 10 is made, will be dictated by whatever substance it will be required to prevent from passing it in an operative situation.

A flanged metallic member 22 having back to back plane surfaces 22a, 22b has a top edge 24 and a bottom edge 26 which, when the plane surface 12b of seal 10 is positioned against plane surface 22a, will be overlapped and underlapped by lips 14 and 16 respectively in close fitting relationship. These features if it be so desired, can be the only features provided for the purpose of locating seal 10 on flange 22 during assembly of one to the other. However, in the present example, bosses 18 and 20 fit in aperture 30 and provide resistance to relative lateral movement of the two parts A clip 32 has length, and in a plane normal to that length is of "U" shape (shown inverted in the drawing). A tag 34 is formed in one leg of the "U" shape by stamping or cutting an appropriate shape through the thickness of the leg e.g. two sides of a triangle, the third side being uncut, or three sides of a rectangle, the fourth side being uncut. In each case, the tag is bent about the line of the uncut side.

Figure 2:
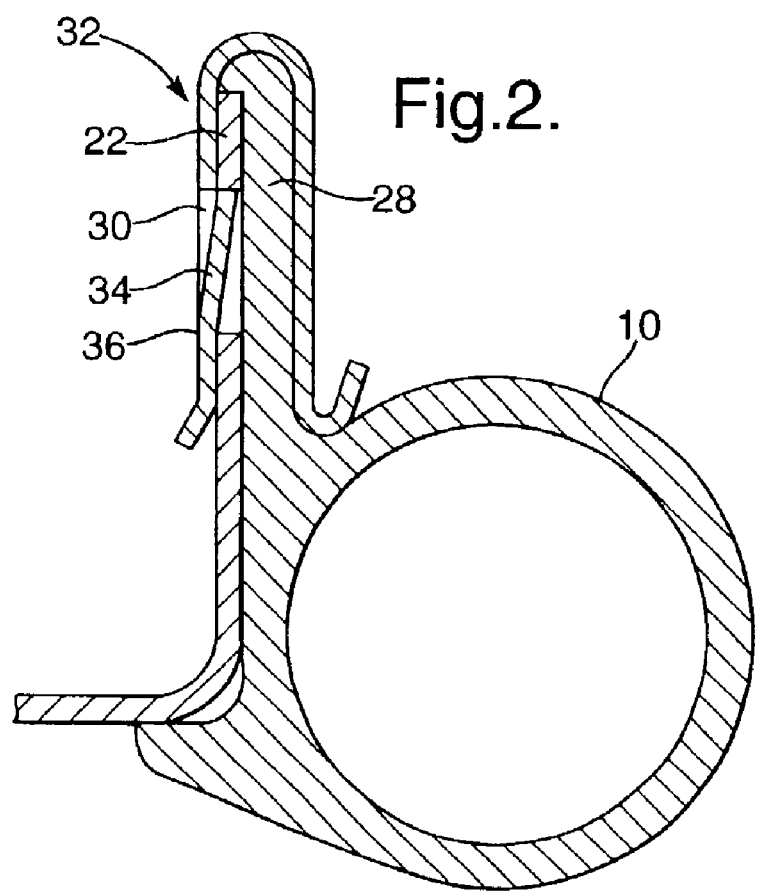
FIG. 2 is a cross sectional view through the constituent parts of FIG. 1, in a direction normal to their major dimensions when assembled.

Referring now to FIG. 2. Clip 32 is preferably made from spring steel and the spacing between the legs of the "U" portion made less than the thickness of the sub assembly over which it is fitted, thereby providing an initial gripping action.

On assembly, seal 10 is fitted to flanged member 22 as described hereinbefore, so that bosses 18 and 20 fit in aperture 30. Clip 32 is then positioned adjacent the rim of flange member 22 so that the or each bent tag or 34 is aligned with the central portion of the or respective apertures 30. Clip 32 is then pushed on to flange member 22 until the tag or tags 34 flip into the or each respective aperture 30. Clip 32 cannot now be removed from flange member 22, until the tag or tags 34 are prised out of its or their respective apertures 30.

The or each tag 34 can be prised from its aperture 30 by an appropriately proportioned lever (not shown). However, if each part of the assembly is so proportioned that when assembled, there is sufficient space to push clip 32 further on to flange 22, then the plane surface 22b of flange member 22 will force the or each tag 34 out of its aperture 30. Clip 32 can then be displaced lengthwise of the assembly to move tag 34 from its alignment with its respective aperture 30. Clip 32 can then be pulled from flange member 22, thus enabling separation of flange member 22 and seal 10.

Figure 3:
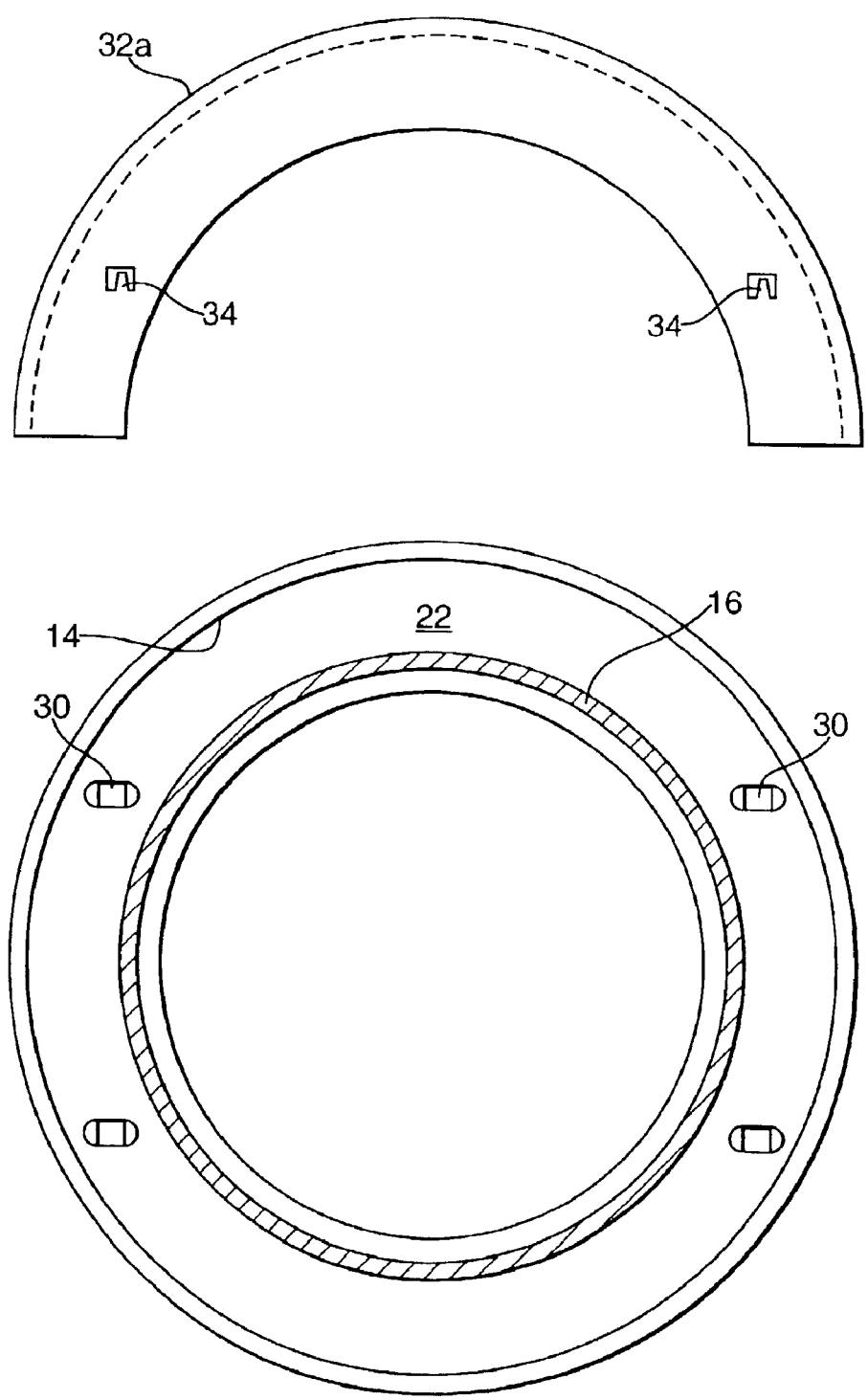
FIG. 3 depicts an alternative form of the present invention.

Referring now to FIG. 3, in which parts corresponding to parts described with reference to FIGS. 1 and 2 are given like numbers. In this example of the present invention, flange member 22 and seal 10 are annular. Clip 32 is thus formed from two identical arcuate portions, only one of which, numbered 32a, is shown. The two arcuate portions are fitted over flange member 22 in opposing radial directions, until tags 34 flip into respective apertures 30. Again, provided the respective dimensions of the parts of the assembly are appropriately proportioned, when it is required that the assembly be separated, the two arcuate clip portions 32a can be pushed closer together so as to cause the tags 34 to be forced from their respective apertures 30. Clip portions 32a can then be rotated to move tags 34 out of alignment with their respective apertures, so as to enable removal of the arcuate clip portions 32a.

Figure 4:
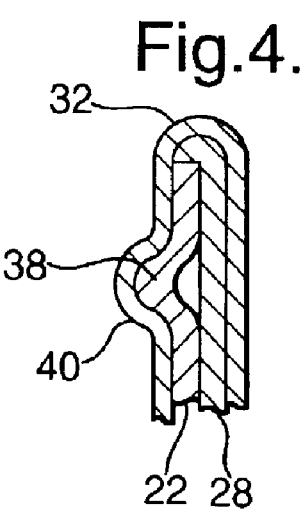
FIG. 4 depicts an alternative form of co-operating fastening means.

Referring now to FIG. 4. In this example of the present invention, the tags 32 and apertures 30 are substituted by dimples 38 in flange member 22, and co-operating dimples in clip 32, which dimples serve the same purpose as tags 34 and apertures 30 in FIGS. 1 to 3.

Figure 5:
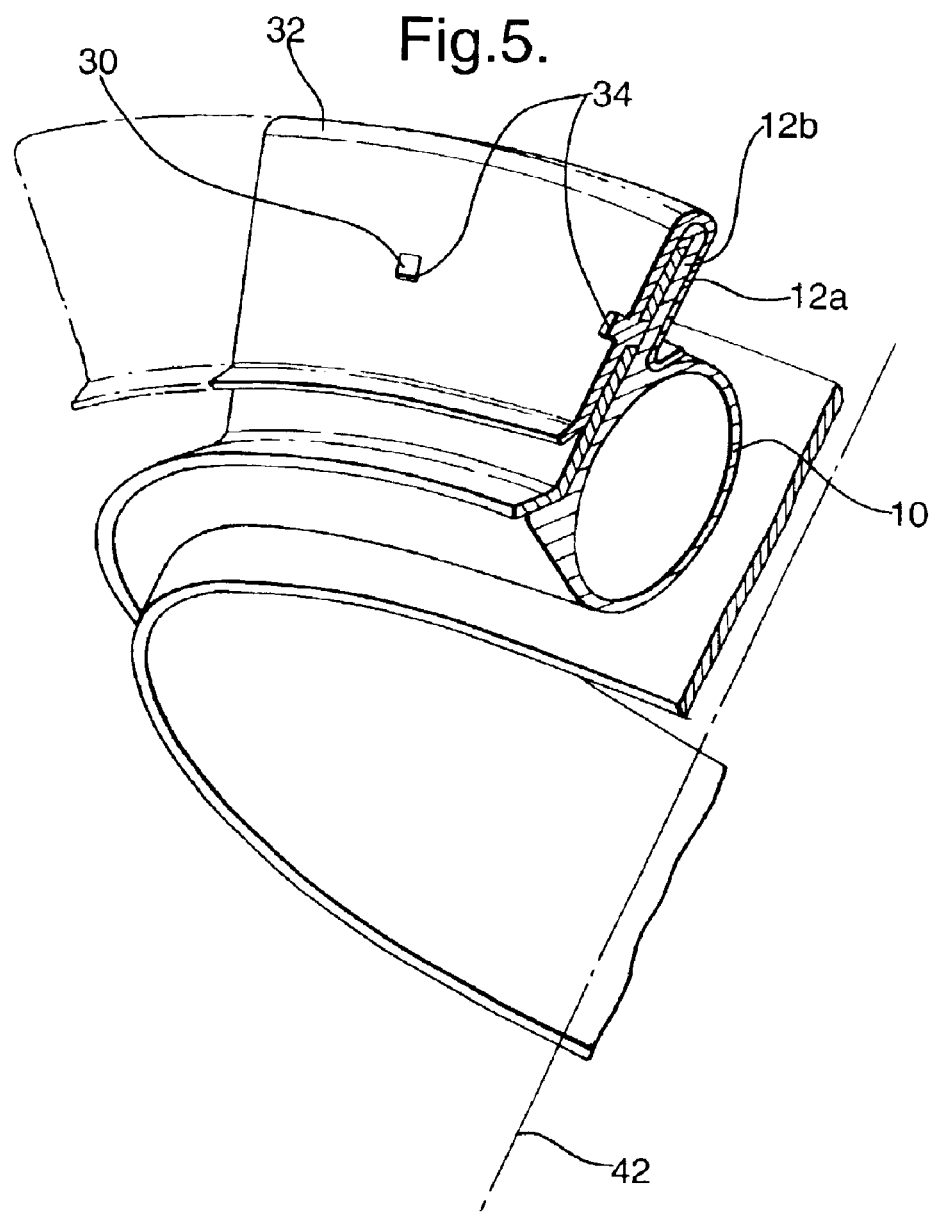
FIG. 5 depicts a further alternative form of the present invention.

Referring now to FIG. 5. In this example of the present invention, seal 10 is toroidal in shape, and its plane surfaces 12*a* and 12*b* are cylindrical. It follows that part 22 corresponding to flange member 22 and clip 32 in FIGS. 1 to 3, are cylindrical also, each part being formed and arranged about a common axis 42. Thus, assembly and dis-assembly thereof is achieved by appropriate relative movement of the parts along axis 42.

I claim:

1. A sealing device comprising a member having back to back plane surfaces, wherein said back to back plane surfaces define flanges on said member and said seal respectively, a seal having back to back plane surfaces, one of the said plane surfaces of the seal is located against one of said plane surfaces of said member, and a clip having length and legs to for a "U" shaped profile normal thereto, in which said member and seal nest when the device is assembled, and integral, co-operating fixing means formed in said member and in one leg of said "U" shaped clip, which fixing means, on assembly of the parts, engage each other and prevent inadvertent separation thereof, wherein said one surface of said seal includes boss means, and said surface of said member against which said one surface locates includes aperture means for receipt of said boss means, so as to provide resistance to relative lateral movement between those assembled parts of the device.

2. A sealing device as claimed in claim 1 wherein said boss means and aperture means are aligned with said tags for assembly, and said boss means are grooved so as to enable said aperture means to receive said tags.

3. A sealing device as claimed in claim 1 wherein said sealing device is a straight structure.

* * * * *